United States Patent
Brugmann

(12) 
(10) Patent No.: US 6,598,906 B2
(45) Date of Patent: Jul. 29, 2003

(54) FLUID COUPLINGS

(75) Inventor: Donald Howard Brugmann, Nevada, OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/793,731

(22) Filed: Feb. 27, 2001

(65) Prior Publication Data

US 2002/0117851 A1 Aug. 29, 2002

(51) Int. Cl.⁷ .............................................. F16L 33/00
(52) U.S. Cl. ..................................... 285/256; 285/259
(58) Field of Search ............................. 285/256, 222.1, 285/259

(56) References Cited

U.S. PATENT DOCUMENTS

| | | | |
|---|---|---|---|
| 2,121,624 A | * | 6/1938 | Cowles ........................ 285/256 |
| 2,250,286 A | * | 7/1941 | White .......................... 285/256 |
| 2,292,421 A | * | 8/1942 | Wolf ........................ 285/256 X |
| 2,410,600 A | * | 11/1946 | Cowles ........................ 285/256 |
| 2,552,077 A | * | 5/1951 | Williams et al. ......... 285/259 X |
| 2,741,496 A | * | 4/1956 | Melsom ................... 285/256 X |
| 2,808,643 A | | 10/1957 | Weatherhead |
| 2,926,029 A | | 2/1960 | Clair |
| 2,978,263 A | | 4/1961 | Walsch |
| 3,347,571 A | * | 10/1967 | New ........................ 285/256 X |
| 3,914,852 A | | 10/1975 | Fisher |
| 4,431,031 A | * | 2/1984 | Ettlinger ................. 285/256 X |
| 4,498,691 A | | 2/1985 | Cooke |
| 4,564,223 A | * | 1/1986 | Burrington ................... 285/256 |
| 4,602,808 A | | 7/1986 | Herron et al. |
| 4,906,030 A | * | 3/1990 | Yokomatsu et al. ......... 285/256 |
| 5,037,142 A | * | 8/1991 | Helping ...................... 285/256 |
| 5,460,247 A | | 10/1995 | Fouts |
| 5,484,174 A | | 1/1996 | Gotoh et al. |
| 5,884,945 A | * | 3/1999 | Bader et al. ............. 285/256 X |
| 6,010,162 A | * | 1/2000 | Grau et al. .............. 285/256 X |
| 6,270,126 B1 | * | 8/2001 | Juedes ..................... 285/256 X |

FOREIGN PATENT DOCUMENTS

| | | | | |
|---|---|---|---|---|
| FR | 1400442 | * | 4/1965 | ................. 285/256 |
| GB | 1440084 | * | 6/1976 | ................. 285/256 |

* cited by examiner

*Primary Examiner*—Lynne H. Browne
*Assistant Examiner*—David E. Bochna
(74) *Attorney, Agent, or Firm*—Millen, White, Zelano & Branigan, P.C.

(57) ABSTRACT

A fluid coupling for coupling a hose to a metal tube, of primary interest in hydraulic brake systems, provides dynamic strain relief so that hoses having stainless steel braided reenforcing layers are made usable for normal highway use because the hoses can withstand Department of Transportation Whip Test while meeting thermal requirements. This is accomplished by a coaxial strain relief element which is integral with an eyelet-type tube fitting wherein the strain relief element is captured by a pocket disposed in the end of a crimping cup. A crimping cup directly engages the stainless steel braided wire reenforcement to clamp the hose against a projecting nipple of the eyelet while having an annular lip portion which seats in the groove in the eyelet and presses the coaxial strain relief element into and direct engagement with the braided reenforcement layer.

7 Claims, 1 Drawing Sheet

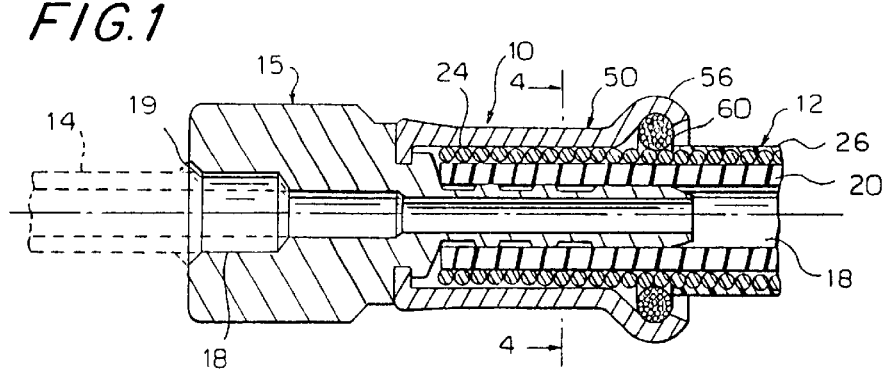
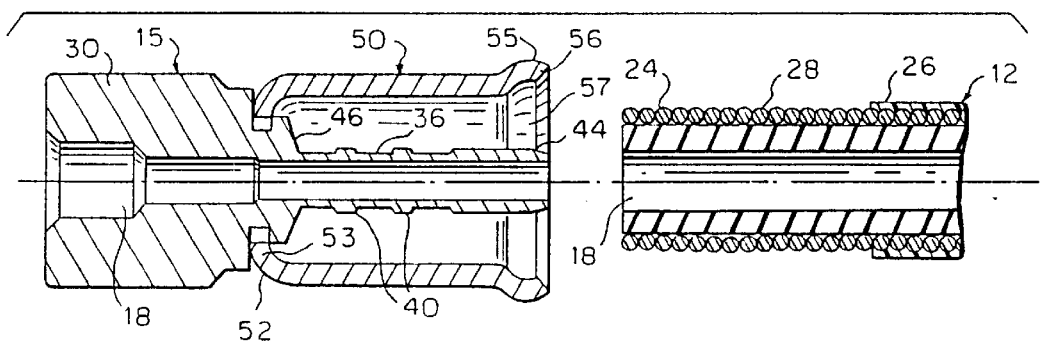
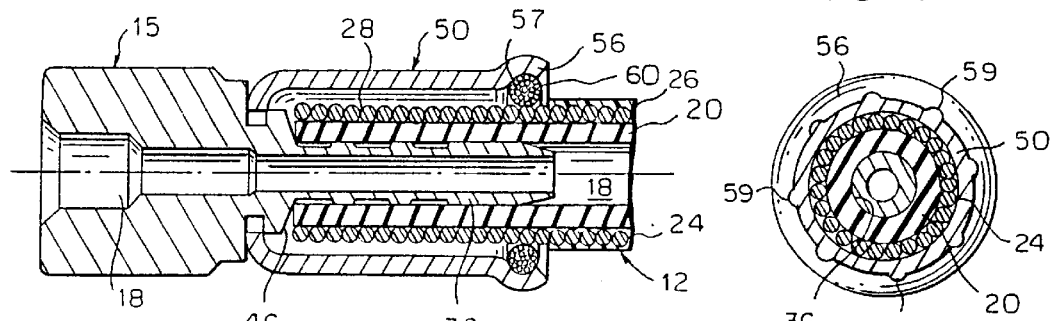
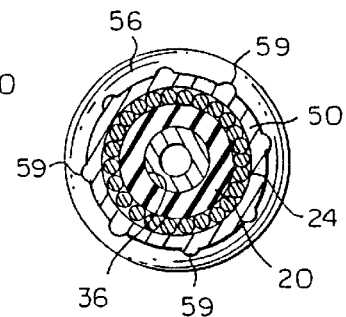
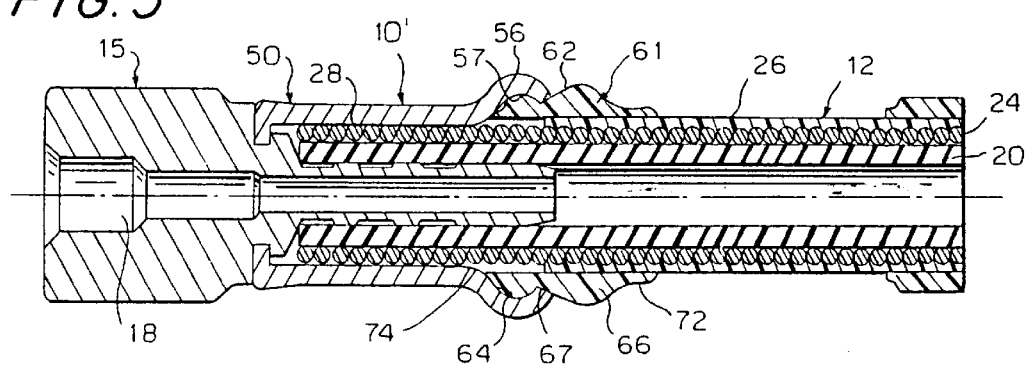

FLUID COUPLINGS

FIELD OF THE INVENTION

The present invention is directed to fluid couplings. More particularly, the present invention is directed to fluid couplings for coupling a reenforced hose to a metal tube wherein the couplings and hose are suitable for use in hydraulic vehicle brake systems.

BACKGROUND OF THE INVENTION

As has been succinicly stated in U.S. Pat. No. 5,460,247 and reiterated here, there have been difficulties with brake hoses reinforced with braided wires. In order to accommodate necessary relative motion between the sprung and unsprung masses of a motor vehicle (i.e., the chassis and suspended wheels), suspension mounted hydraulic brakes are connected to the chassis by flexible hydraulic hoses. These hoses are typically fabricated form fabric braid reinforced elastomers.

Standard original equipment of such fabric reinforced flexible brake hoses for motor vehicles expand or swell to some extent under pressure, thus consuming available brake pedal travel which can result in a relatively "soft" feel to the brake pedal. This soft feel reduces the precision of brake modulation by the driver. These conditions are unacceptable in racing cars. For over 30 years, racing cars have been equipped with flexible brake hoses having a stainless steel braid layer over extruded Teflon. These hoses exhibit considerably less expansion under pressure resulting in higher and firmer brake pedal and a larger margin of safety because of more even friction pad wear and more precise brake modulation.

Despite an outstanding record of performance and reliability in racing and off-highway use, these high performance flexible brake hoses have not been certified for highway use because they have been unable to comply with the Basic Motor Vehicle Safety Standard 106, Section 56.3 (whip resistance test) set by the U.S. Department of Transportation (DOT).

Past efforts to substitute stainless steel braid protected Teflon flexible hose for the original equipment elastomeric brake hose on vehicles has usually led to fatigue failure of the protective braid at the end of the crimp or swedged collar or socket of the hose end fitting followed by fatigue failure of the Teflon hose and resultant loss of pressure. Consequently, there is a need for flexible brake hose assemblies that accommodate necessary relative motion between the chassis and wheels of a vehicle and passes all aspects of the whip resistance test required by the DOT.

One approach is to remove the stainless steel, braided reinforcement from the hose in the area of a metal coupling, but since the hose is made of polytetrafluoroethylene (PTFE), the hose tends not to meet thermal requirements when exposed to hot hydraulic fluid.

Hydraulic brake lines are one recognizable need for the invention, other needs arise when reinforced hoses are attached to other devices which may or may not be connected by tubes.

SUMMARY OF THE INVENTION

In view of the aforementioned considerations, the present invention is directed to a fluid coupling for coupling a hose to a device wherein the hose includes a deformable, resilient inner layer, a wire enforcement layer over the inner layer and an outer protective layer over the wire reenforcement layer. The fluid coupling comprises a fitting or "eyelet" having a first and a second portion; the first portion having a bore adapted to communicate with the device and a second portion having a projecting nipple for receipt in the hose, the eyelet further having an annular exterior groove therein. A crimping cup having first and second ends for mounting on the eyelet, wherein the crimping cup is disposed around the projecting nipple and initially has an inside diameter greater than the outside diameter of the hose. The crimping cup further has an inwardly projecting lip aligned with the exterior groove in the eyelet and a bell shaped pocket adapted to be disposed adjacent to an end portion of the hose which has been stripped of the outer layer. A coaxially strain relief element is disposed in the bell shaped pocket and is urged against the wire enforcement when the crimping cup is deformed radially inwardly to press the inner layer of the hose against the nipple and the inwardly projecting lip into the exterior groove in the tube fitting.

In accordance with one embodiment of the present invention, the coaxial strain relief element is an o-ring of resilient material, and in accordance with another embodiment of the invention, the coaxially strain relief is an annular ring having contoured exterior surface with a bulge received in the pocket of bell shaped end and a portion adapted to extend over the outer layer of the hose.

In accordance with a further embodiment of the invention, the fluid coupling is a coupling for coupling a hydraulic brake hose having a braided wire reenforcement layer to a metal tube.

BRIEF DESCRIPTION OF THE DRAWINGS

FIG. 1 is a side elevation of a first embodiment of a fluid coupling configured in accordance with the present invention.

FIG. 2 is a side view showing a hose and hose coupling in accordance with the present invention separated prior to joining the hose to the hose coupling;

FIG. 3 is a side elevation showing the hose and hose coupling joined prior to crimping so as to create the hose coupling of FIG. 1;

FIG. 4 is a view taken along lines 4—4 of FIG. 1 showing crimps in a crimping cup surrounding the hose;

FIG. 5 is a side elevation showing a second embodiment of the present invention;

DETAILED DESCRIPTION

Referring now to FIG. 1 there is shown a fluid coupling 10 configured in accordance with the present invention wherein a hose 12 is coupled to a device such as for example a metal tube using an eyelet 15. The eyelet 15 has a stepped bore 18 in which the metal tube 14 is fixed by brazing 19 (shown in dotted lines). While a metal tube 14 is used as the device if the invention is applied to a brake system, it is to be kept in mind that the device may be any other instrumentality which uses fluid.

As best seen in the exploded view of FIG. 2, the hose 12 comprises a bore 18 through a Teflon® (polytetrafluoroethylene) tubular inner layer 20 of the hose 12. A stainless steel braided layer 24 surrounds the inner layer 20 and an outer polyvinylchloride (PVC) layer 26 surrounds the stainless steel braided layer 24. The PVC layer 26 has as it primary purpose keeping dust off the braided stainless steel layer 24 when the hose is used as a brake hose. In accordance with the present invention, an end portion 28 of the hose has the PVC layer 26 removed so that the stainless steel braided layer 24 is exposed.

As is best seen in FIG. 2, the eyelet 15 has a first end 30 with the stepped bore 18 in which the tube 14 is braised and a second end 32 with a nipple 36 which is revived in the bore 18 of the hose 12. The nipple 36 has at least one, or preferably two, annular lands 40 and a tapered end 44. A groove 45 is positioned in the eyelet 15 just inboard of a stop surface 46 adjacent to the nipple 36. A crimping cup 50 is positioned coaxially around the nipple 36 and has at a first end 52 an annular lip 53 which is aligned with the groove 45. At a second end 55 of the crimping cup 50, the crimping cup has a bell-shaped portion 56 that defines a pocket 57. During assembly, a rubber O-ring 58 is placed over the portion 28 of the hose 12 which has had the PVC layer 26 stripped and the hose is shoved over the nipple 36 so that the nipple is received in the bore 18 of the hose. When the end of the hose 12 abuts the stop surface 46, the hose is properly positioned with respect to the crimping collar 50. Upon being crimped, the crimping collar 50 reduces its diameter to form crimps 59 (FIG. 4) and presses the annular lip 53 into the grove 45 of the eyelet and presses the interior surface 51 of the crimping collar directly against the exposed portion of the braided stainless steel reenforcement 24 (see FIGS. 1 and 4). The rubber O-ring 60 is also retained against the braided stainless steel reenforcement layer 24.

The O-ring 60 serves as a strain relief element and a shock absorber so that as the hose 12 is flexed during a whip resistance test, such as that acquired by the Department of Transportation for highway use vehicles, the braided wire reenforcement layer 24 does not fray or fail and thus provides dynamic, coaxial strain relief for the reenforced hose 12.

Referring now to FIG. 5, there is shown a second embodiment 10' of the invention in which a second embodiment 61 of the strain relief element is shown, all of the other elements being the same. The strain relief element 61 is preferably made of thermoplastic polyamide (NYLON7) or another resinous material and has a contoured surface 62 comprising a first bulge 64 and a second bulge 66 defining a valley 67 therebetween. The first bulge 64 is received in the pocket 57 of the crimping cup 50 and overlies the portion 28 stripped of PVC of the stainless steel braided wire reenforcement 24. The coaxial strain relief element 61 has an extended portion 72 which includes the second bulge 66 and extends axially over the stainless steel, braided wire reenforcement 24 as well as over the PVC outer layer 26. The PVC outer layer 26 under the extended portion preferably remains on the hose 12 but be removed from the hose. By extending past the end 55 of the crimping cup 50, the coaxial strain relief element 61 moves stresses further out onto the hose 12 away from a pinch point 74 where the collar portion of a crimping cup is pressed directly in engagement with the stainless steel, braided wire reenforcement 24. By moving the stresses further out onto the hose 12 the stainless steel, braided wire reenforcement 24 remains rigid out beyond the pinch point 74, and thus the required stress relief is accomplished which results in the hose 12 withstanding the aforementioned whip test.

It has been found that the resulting couplings 10 and 10' make stainless steel reenforced hoses suitable for highway use because the hoses can pass the Department of Transportation Whip test.

From the foregoing description, one skilled in the art can easily ascertain the essential characteristics of this invention, and without departing form the spirit and scope thereof, can make various changes and modifications of the invention to adapt it to various usages and conditions.

What is claimed is:

1. A fluid coupling for coupling a hydraulic hose of a selected outside diameter to a device, wherein the hose includes a deformable resilient polytetrafluoroethylene inner layer; a stainless steel wire reinforcement layer over the polytetrafluoroethylene inner layer, and a deformable resilient outer layer over the stainless steel wire reenforcement layer, the fluid coupling comprising:

an eyelet having first and second portions; the first portion having a bore adapted to communicate with the device and the second portion having a projecting nipple adapted for receipt in the hose, the eyelet further having an annular exterior groove therein;

a crimping cup having first and second ends, the crimping cup being disposed around the projecting nipple and initially having an inside diameter greater than the outside diameter of the hose, the crimping cup further having an inwardly projecting lip aligned with the annular exterior groove in the eyelet and a bell-shaped pocket adapted to be disposed adjacent to an end portion of the hose which has been stripped of the outer layer, and a coaxial strain-relief element configured as an annular ring made of thermoplastic polyamide and having a contoured exterior surface with a bulge disposed in the bell-shaped pocket, the coaxial strain relief element being urged against the stainless steel wire reenforcement when the crimping cup is deformed radially inwardly to press the polytetrafluoroethylene inner layer of the hose against the nipple and to press the inwardly projecting lip into the exterior groove in the eyelet.

2. The fluid coupling of claim 1 wherein a metal tube is brazed into the bore within the tube fitting.

3. The fluid coupling of claim 1 wherein the nipple has at least one annular tooth which deforms the inner resilient layer of the hose when the crimping cup is crimped against the wire reenforcing layer.

4. The fluid coupling of claim 1 wherein the eyelet has a radial stop adjacent to the nipple and to the annular exterior groove against which the hose abuts when pushed over the nipple.

5. A fluid coupling in combination with a hydraulic brake hose of a selected outside diameter used in a vehicle for coupling the brake hose to a metal tube, wherein the brake hose includes a deformable polytetrafluoroethylene inner layer, a braided stainless steel wire layer over the polytetrafluoroethylene inner layer and an outer layer of deformable resilient material over the braided stainless steel wire layer, comprising:

an eyelet having first and second portion; the first portion having a stepped bore adapted to receive the metal tube and the second portion having a projecting nipple adapted to be received in the hose, the eyelet further having an annular exterior groove therein;

a crimping cup having first and second ends, the crimping cup being disposed around the projecting nipple and initially having an inside diameter greater than the outside diameter of the hose, the crimping cup further having an inwardly projecting lip aligned with the exterior groove in the eyelet and a bell-shaped pocket disposed adjacent to an end portion of the hose which has been stripped of the outer layer, and a coaxial strain relief configured as an annular ring made of thermoplastic polyamide and having a contoured exterior surface with a bulge element disposed in the bell-shaped pocket and being urged against the braided stainless steel wire layer when the crimping cup is deformed radially inwardly to press the polytetrafluoroethylene inner layer of the hose against the nipple and the inwardly projecting lip into the exterior groove in the eyelet.

6. The fluid coupling of claim 5 wherein the resilient material is rubber.

7. The fluid coupling of claim 5 wherein the outer layer is made of polyvinylchloride.

* * * * *